United States Patent
Ji

(10) Patent No.: US 11,376,985 B2
(45) Date of Patent: Jul. 5, 2022

(54) CHARGER SHARING SYSTEM AND CHARGER SHARING METHOD

(71) Applicants: HYUNDAI MOTOR COMPANY, Seoul (KR); KIA MOTORS CORPORATION, Seoul (KR)

(72) Inventor: Sungmin Ji, Incheon (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 113 days.

(21) Appl. No.: 16/916,837

(22) Filed: Jun. 30, 2020

(65) Prior Publication Data

US 2021/0178924 A1 Jun. 17, 2021

(30) Foreign Application Priority Data

Dec. 16, 2019 (KR) .................. 10-2019-0167474

(51) Int. Cl.
| | |
|---|---|
| *B60L 53/63* | (2019.01) |
| *B60L 53/36* | (2019.01) |
| *B60L 53/66* | (2019.01) |
| *B60L 53/30* | (2019.01) |
| *B60L 53/65* | (2019.01) |

(52) U.S. Cl.
CPC ............. *B60L 53/63* (2019.02); *B60L 53/305* (2019.02); *B60L 53/36* (2019.02); *B60L 53/665* (2019.02); *B60L 53/65* (2019.02)

(58) Field of Classification Search
CPC ........ B60L 53/63; B60L 53/305; B60L 53/36; B60L 53/665
See application file for complete search history.

(56) References Cited

U.S. PATENT DOCUMENTS

| | | | | |
|---|---|---|---|---|
| 2016/0352113 | A1* | 12/2016 | Zhao ....................... | B60L 53/35 |
| 2020/0016985 | A1* | 1/2020 | Sham ....................... | B60L 53/63 |
| 2020/0269835 | A1* | 8/2020 | Hara ....................... | G07C 5/004 |

FOREIGN PATENT DOCUMENTS

JP 2019087087 A * 6/2019 ......... G07F 17/0057

OTHER PUBLICATIONS

Machine translation of JP-2019087087-A (Year: 2021).*

* cited by examiner

*Primary Examiner* — David V Henze-Gongola
(74) *Attorney, Agent, or Firm* — Morgan, Lewis & Bockius LLP

(57) ABSTRACT

A charger sharing system includes an occupant terminal, a subscriber terminal, and a charger connected through a network, and the charger may be configured to receive a reservation request message comprising charger reservation information from the subscriber terminal and determine whether to register the charger reservation information based on a reservation type included in the charger reservation information.

12 Claims, 9 Drawing Sheets

CHARGER SHARING SYSTEM AND CHARGER SHARING METHOD

CROSS-REFERENCE TO RELATED APPLICATION

This application is based on and claims priority under 35 U.S.C. § 119 to Korean Patent Application No. 10-2019-0167474, filed on Dec. 16, 2019 in the Korean Intellectual Property Office, the disclosure of which is incorporated herein by reference.

BACKGROUND

The disclosure relates to a charger sharing system and charger sharing method.

A charger is a device for charging electricity in a battery built in an electric vehicle, and may be classified into various types according to a charging speed and an installation type. Rapid chargers can be recharged quickly but are expensive to install. The slow charger takes a long time to fully charge and is usually installed for home use.

The charger needs as little as 30 minutes or as long as 6 hours to fully charge the vehicle battery. In addition, since the vehicle needs space to park while charging, the charging of the electric vehicle soon leads to parking. Therefore, there is a limit to the number of chargers installed in multi-family houses or public places where the parking space is limited. In Korea, many multi-family homes have many limitations in the use and installation of chargers and many problems with installing and using chargers.

For example, if all chargers are in use, a waiter may have to wait up to six hours. In addition, the owner of the vehicle occupying the charger is obliged to move the vehicle when charging is complete. This situation can be inconvenient for both the waiter and the owner of the vehicle occupying the charger. Sometimes severe conflicts arise between the waiter and the occupant. While the number of electric vehicle drivers is increasing, the supply of chargers is insufficient, and the inconvenience of users in sharing chargers is increasing.

SUMMARY

Therefore, it is an aspect of the disclosure to provide a charger sharing system that enable users to effectively share a charger of a vehicle, and a charger sharing method.

In addition, it is an aspect of the disclosure to provide a charger sharing system capable of activating charger sharing by providing benefits to users, and relieving inconvenience caused in the charger sharing process, and a charger sharing method.

In accordance with one aspect of the disclosure, a charger sharing system includes: an occupant terminal, a subscriber terminal, and a charger connected through a network, and the charger may be configured to receive a reservation request message comprising charger reservation information from the subscriber terminal and determine whether to register the charger reservation information based on a reservation type included in the charger reservation information.

The charger may be configured to register the charger reservation information when the reservation type is a free reservation and transmit the charger reservation information to the occupant terminal when the reservation type is a paid reservation.

The charger sharing system may further include: a bidder terminal connected via the network, and the charger may be configured to confirm a bid setting information from the occupant terminal when the reservation type is paid reservation, and receive a bid message from the bidder terminal based on the bid setting information or register the charger reservation information with the charger.

The charger may be configured to transmit a bid information included in the bid message to the occupant terminal based on receiving the bid message from the bidder terminal and register the bid information based on receiving a reservation change message from the occupant terminal.

The charger may be configured to register the charger reservation information when the bid message is not received from the bidder terminal or a reservation change message is not received from the occupant terminal.

The charger may be configured to transmit a notification message to the subscriber terminal after charging of the occupant vehicle is completed.

The charger may be configured to obtain a parking setting information of the occupant vehicle from the occupant terminal when charging of the occupant vehicle is completed, and execute an autonomous parking of the occupant vehicle based on the parking setting information or transmit a control authority of the occupant vehicle to the subscriber terminal.

The charger may be configured to, when executing the autonomous parking of the occupant vehicle, transmit a parking location information and a parking completion message to the occupant terminal after moving the occupant vehicle to a predetermined location.

The charger may be configured to receive the parking location information and the parking completion message of the occupant vehicle from the subscriber terminal when transmitting the control authority of the occupant vehicle to the subscriber terminal and transmit the parking location information and the parking completion message to the occupant terminal.

The charger may be configured to transmit a payment information to the subscriber terminal after charging of the occupant vehicle is completed when the reservation type is paid reservation.

In accordance with another aspect of the disclosure, a charger sharing method includes: receiving a reservation request message comprising charger reservation information from the subscriber terminal by the charger; and determining whether to register the charger reservation information based on a reservation type included in the charger reservation information.

The determining whether to register the charger reservation information may include: registering the charger reservation information when the reservation type is a free reservation; and transmitting the charger reservation information to the occupant terminal when the reservation type is a paid reservation.

The determining whether to register the charger reservation information may include: confirming a bid setting information from the occupant terminal when the reservation type is paid reservation; and receiving a bid message from the bidder terminal based on the bid setting information or register the charger reservation information with the charger.

The determining whether to register the charger reservation information may include: transmitting a bid information included in the bid message to the occupant terminal based on receiving the bid message from the bidder terminal; and registering the bid information based on receiving a reservation change message from the occupant terminal.

The determining whether to register the charger reservation information may include: registering the charger reservation information when the bid message is not received from the bidder terminal or a reservation change message is not received from the occupant terminal.

The charger sharing method may further include: transmitting a notification message to the subscriber terminal after charging of the occupant vehicle is completed.

The charger sharing method may further include: obtaining a parking setting information of the occupant vehicle from the occupant terminal when charging of the occupant vehicle is completed; and executing an autonomous parking of the occupant vehicle based on the parking setting information or transmitting a control authority of the occupant vehicle to the subscriber terminal.

The charger sharing method may further include: when executing the autonomous parking of the occupant vehicle, transmitting a parking location information and a parking completion message to the occupant terminal after moving the occupant vehicle to a predetermined location.

The charger sharing method may further include: receiving the parking location information and the parking completion message of the occupant vehicle from the subscriber terminal when transmitting the control authority of the occupant vehicle to the subscriber terminal; and transmitting the parking location information and the parking completion message to the occupant terminal.

The charger sharing method may further my include: transmitting a payment information to the subscriber terminal after charging of the occupant vehicle is completed when the reservation type is paid reservation.

BRIEF DESCRIPTION OF THE DRAWINGS

These and/or other aspects of the disclosure will become apparent and more readily appreciated from the following description of the embodiments, taken in conjunction with the accompanying drawings.

DETAILED DESCRIPTION

Figure 1:
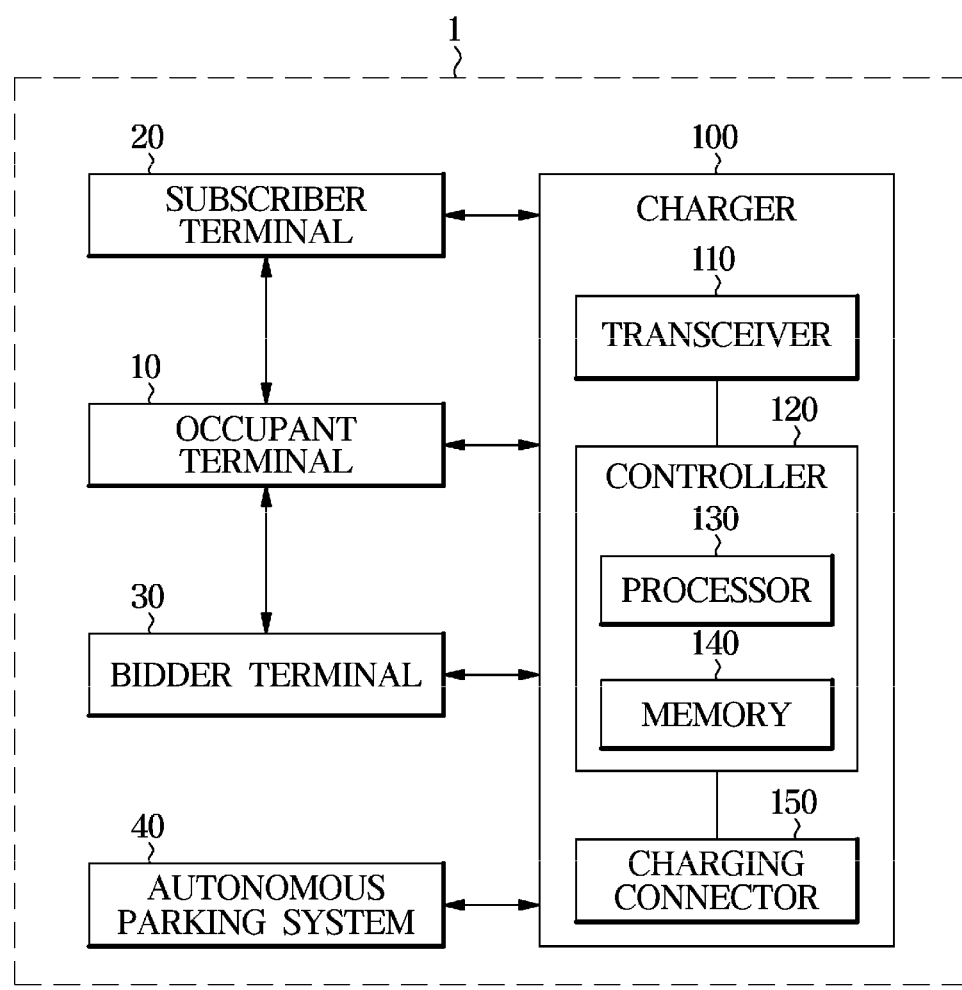
FIG. 1 illustrates a control block diagram of a charger sharing system according to an embodiment of the disclosure.

Like reference numerals refer to like elements throughout the specification. Not all elements of embodiments of the disclosure will be described, and description of what are commonly known in the art or what overlap each other in the embodiments will be omitted. The terms as used throughout the specification, such as "part," "module," "member," "block," etc., may be implemented in software and/or hardware, and a plurality of "parts," "modules," "members," or "blocks" may be implemented in a single element, or a single "part," "module," "member," or "block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, the operation principles and embodiments of the disclosure will be described with reference to the accompanying drawings.

FIG. 1 illustrates a control block diagram of a charger sharing system according to an embodiment of the disclosure.

Referring to FIG. 1, the charger sharing system 1 may include an occupant terminal 10, a subscriber terminal 20, and a charger 100. The charger sharing system 1 may further include a bidder terminal 30, and may further include an autonomous parking system 40. The occupant terminal 10 may mean a terminal possessed by an occupant of a vehicle currently occupying the charger 100. The subscriber terminal 20 may be a terminal possessed by a subscriber who intends to reserve the use of the charger 100. The bidder terminal 30 may be a terminal possessed by a bidder who is in competition with a subscriber.

The charger 100 may be connected to an occupant terminal 10 and a subscriber terminal 20 through a network. In addition, the charger 100 may be connected to the bidder terminal 30 through a network. The charger 100 may be connected to the autonomous parking system 40 through a network.

The occupant terminal 10, the subscriber terminal 20, and the bidder terminal 30 may also be connected to each other via a network. The autonomous parking system 40 may be provided separately from the charger sharing system 1 or may be connected to the charger sharing system 1 through a network.

The occupant terminal 10, the subscriber terminal 20, and the bidder terminal 30 may each be implemented in various devices. For example, the occupant terminal 10, the subscriber terminal 20, and the bidder terminal 30 may be implemented as a video telephones, a cellular phone, a smart phone, a wideband code division multiple access (WCDMA) terminal device, an universal mobile telecommunication service (UMTS) terminal device, a personal digital assistant (PDA), a portable multimedia player (PMP), a digital multimedia broadcasting (DMB) terminal device, a portable computer device, or a desktop computer.

In each of the charger 100, the occupant terminal 10, the subscriber terminal 20, and the bidder terminal 30, an application for accessing the charger sharing system or executing the charger sharing method may be installed.

The charger 100 may include a transceiver 110, a controller 120, and a charging connector 150. The controller 120 may be electrically connected to the transceiver 110 and the charging connector 150. The transceiver 110 may communicate with one or more of the occupant terminal 10, the subscriber terminal 20, the bidder terminal 30, or the autonomous parking system 40 under the control of the controller 120. The transceiver 110 may be a communication circuit to which various communication technologies are applied.

The controller 120 may include a processor 130 and a memory 140, and may control an operation of the charger 100. The controller 120 may be implemented in hardware, such as a control circuit. The memory 140 stores programs and/or instructions for controlling the operation of the charger 100. The processor 130 may execute a program and/or instruction stored in the memory 140. The processor 130 and the memory 140 may be integrated as one chip or provided as separate chips. In addition, at least one processor 130 and at least one memory 140 may be provided.

The memory 140 may be implemented as a nonvolatile memory device such as cache, Read Only Memory (ROM), Programmable ROM (PROM), Erasable Programmable ROM (EPROM), Electrically Erasable Programmable ROM (EEPROM), and Flash memory or a volatile memory devices such as random access memory (RAM), or a storage media such as hard disk drives (HDDs), CD-ROMs.

The charging connector 150 may be connected to the vehicle and may provide power for charging the battery of the vehicle. The charging connector 150 transfers power to the battery of the vehicle connected under the control of the controller 120.

Figure 2:
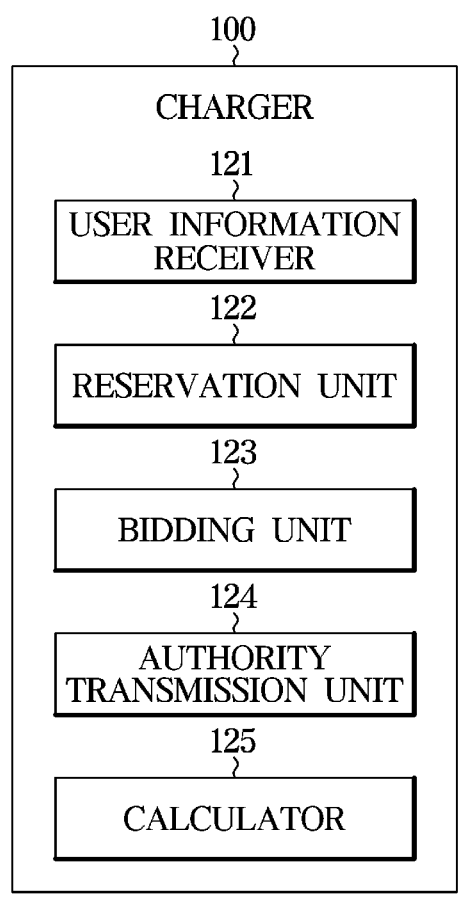
FIG. 2 illustrates a control block diagram of a charger according to an embodiment of the disclosure.

FIG. 2 illustrates a control block diagram of a charger according to an embodiment of the disclosure.

Referring to FIG. 2, the charger 100 may include a user information receiver 121, a reservation unit 122, a bidding unit 123, an authority transmission unit 124 and a calculator 125. The user information receiver 121, the reservation unit 122, the bidding unit 123, the authority transmitting unit 124, and the calculator 125 may be included in the controller 120, and may be understood as software divided into blocks executed by the processor 120.

The user information receiver 121 may receive subscriber information from the subscriber terminal 20. In addition, the user information receiver 121 may receive bidder information from the bidder terminal 30. In addition, the user information receiver 121 may receive occupant information from the occupant terminal 10. The occupant information, reservation information, and/or bidder information may include login information for performing a communication connection with the charger 100. The user may be connected to the charger 100 through various login methods. For example, the user may access the charger 100 by manipulating the terminals 10, 20, 30, and inputting an ID and a password, or may access the charger 100 by photographing a QR code.

The reservation unit 122 may receive a reservation request message including charger reservation information from the subscriber terminal 20. The reservation unit 122 may receive a reservation request message from the subscriber terminal 20 when charger sharing is allowed by the occupant terminal 10. That is, the occupant may set whether to share the charger 100 using the occupant terminal 10. The charger reservation information transmitted from the subscriber terminal 20 may be defined as first reservation information.

The charger reservation information (first reservation information) may include a reservation type, a vehicle identification number of the subscriber vehicle, a vehicle number of the subscriber vehicle, a subscriber comment, and a parking function of the subscriber vehicle. In addition, the charger reservation information may include a reservation amount. The reservation's comments may include the reservation's residence information and/or the reservation's contact information. The parking function of the subscriber vehicle may mean an autonomous parking function.

The reservation type may include free reservation or paid reservation. Free reservation means that the charger 100 is used in the order of reservation following the occupant currently using the charger 100. Paid reservation means paying a certain amount regardless of the order of reservation and having priority to using charger (100). In the case of paid reservation, there is a competition between the first subscriber and the bidder who requests the reservation.

The reservation unit 122 may register charger reservation information received from the subscriber terminal 20. The reservation unit 122 may register charger reservation information immediately when the reservation type is free reservation. The reservation unit 122 may transmit a reservation completion message to the subscriber terminal 20 when the charger reservation information is registered. When the charger reservation information is registered, the subscriber may use the charger 100 after the charging of the occupant vehicle is completed.

The reservation unit 122 may transmit the charger reservation information to the occupant terminal 10 when the reservation type is paid reservation. The occupant terminal 10 may display the charger reservation information on the screen. That is, the occupant terminal 10 may display the vehicle identification number of the subscriber vehicle, the vehicle number of the subscriber vehicle, the reservation comment, the parking function of the subscriber vehicle, and the reservation amount.

The bidding unit 123 may check bid setting information from the occupant terminal 10 when the reservation type received from the subscriber terminal 20 is paid reservation. The bid setting information may include information on whether to allow bidding, a maximum number of bids when bidding is allowed, and a bid acceptance condition. For example, the maximum number of bids may be five. If the number of bids is not limited, it may cause inconvenience to occupant.

The bid acceptance condition may include charging time and/or charging amount. For example, the occupant may set the bidding to be possible after two hours of charging time of the occupant vehicle currently being charged using the occupant terminal 10. In addition, the occupant may set the bidding to be possible when the charging amount of the occupant vehicle currently being charged is 70% or more.

The bidding unit 123 may receive a bid message from the bidder terminal 30 based on the bid setting information. The bidding unit 123 may receive a bid message from the bidder terminal 30 when bidding is allowed. The bid message may include bid information. The bid information may include a vehicle identification number of the bidder vehicle, a vehicle number of the bidder vehicle, a bidder comment, the parking function of the bidder vehicle and the bid amount. The parking function of the bidder vehicle may mean an autonomous parking function. The bid amount may be higher than the reservation amount. Bid information may be defined as second reservation information.

The bidding unit 123 may transmit bid information (second reservation information) to the occupant terminal 10 based on the bid message received from the bidder terminal 30. The occupant terminal 10 may display the bid information on the screen. That is, the occupant terminal 10 may display the vehicle identification number of the bidder vehicle, the vehicle number of the bidder vehicle, the bidder comment, the parking function of the bidder vehicle, and the bid amount on the screen.

The occupant terminal 10 may display charger reservation information (first reservation information) and bid information (second reservation information) on the screen. The occupant may select one of the charger reservation information (first reservation information) or the bid information (second reservation information). For example, a higher amount may be selected from a reservation amount included in the charger reservation information and a bid amount included in the bid information. Since a bidder is a person who requests a reservation later than a subscriber, a bid amount of bid information (second reservation information) is generally higher than a reservation amount of the charger reservation information (first reservation information).

The reservation unit 122 may register the bid information based on the reception of a reservation change message from the occupant terminal 10. When the charger reservation information (first reservation information) is received first, the reservation may be changed by the occupant selecting the bid information (second reservation information). That is, the charger 100 may register the bid information (second reservation information) as a priority instead of the charger reservation information (first reservation information) received first. When the bid information (second reservation information) is registered, the bidder becomes a subscriber.

On the other hand, if it is determined that bidding is not allowed, the reservation unit 122 may register the charger reservation information (first reservation information) received from the subscriber terminal 20. In addition, when a bid message is not received from the bidder terminal 30, the reservation unit 122 may register the charger reservation information (first reservation information). When the reservation change message is not received from the occupant terminal 10, the reservation unit 122 may register the charger reservation information (first reservation information). In addition, if there is no additional bidder wishing to make a reservation or occupant does not change the reservation, the charger reservation information (first reservation information) received first is registered.

The authority transmission unit 124 may transmit a notification message to the subscriber terminal 20 after the charging of the occupant vehicle is completed. In addition, when the charging of the occupant vehicle is completed, the authority transmission unit 124 may obtain the parking setting information of the occupant vehicle from the occupant terminal 10. The authority transmission unit 124 may perform autonomous parking of the occupant vehicle or transmit the control authority of the occupant vehicle to the subscriber terminal 20 based on the parking setting information.

The parking setting information includes whether autonomous parking of an occupant vehicle is allowed (autonomous parking on) or not allowed (autonomous parking off). The authority transmission unit 124 may execute autonomous parking of an occupant vehicle when autonomous parking is allowed. In contrast, the authority transmission unit 124 may transmit the control authority of the occupant vehicle to the subscriber terminal 20 when autonomous parking of the occupant vehicle is not allowed (autonomous parking off). The control authority of the occupant vehicle may be implemented with a digital key. The control authority of the occupant vehicle transmitted to the subscriber terminal 20 is available only for a predetermined time.

When the authority transmission unit 124 executes autonomous parking of an occupant vehicle, the authority transmission unit 124 may move the occupant vehicle to a predetermined location and then transmit the parking location information and the parking completion message to the occupant terminal 10. The authority transmission unit 124 may control the occupant vehicle through the autonomous parking system 40. In other words, the authority transmission unit 124 may generate an execution signal of autonomous parking and transmit the execution signal of the autonomous parking to the autonomous parking system 40. The autonomous parking system 40 may control the occupant vehicle when receiving the execution signal of the autonomous parking.

When the authority transmission unit 124 transmits the control authority of the occupant vehicle to the subscriber terminal 20, the authority transmission unit 124 may receive the parking location information and the parking completion message of the occupant vehicle from the subscriber terminal 20. The authority transmission unit 124 may transmit the parking location information and the parking completion message to the occupant terminal 10. The occupant may confirm that the vehicle has been moved safely through parking location information and parking completion message.

The calculator 125 may transmit payment information to the subscriber terminal 20 or the bidder terminal 30 when the reservation type is paid reservation. In addition, the calculator 125 may receive payment completion information from the subscriber terminal 20 or the bidder terminal 30. The calculator 125 may transfer some of the paid reservation amount or bid amount to the occupant terminal 10. That is, the amount paid by the subscriber terminal 20 or the bidder terminal 30 may be distributed to the charger sharing system 1 and the occupant terminal 10.

Figure 3:
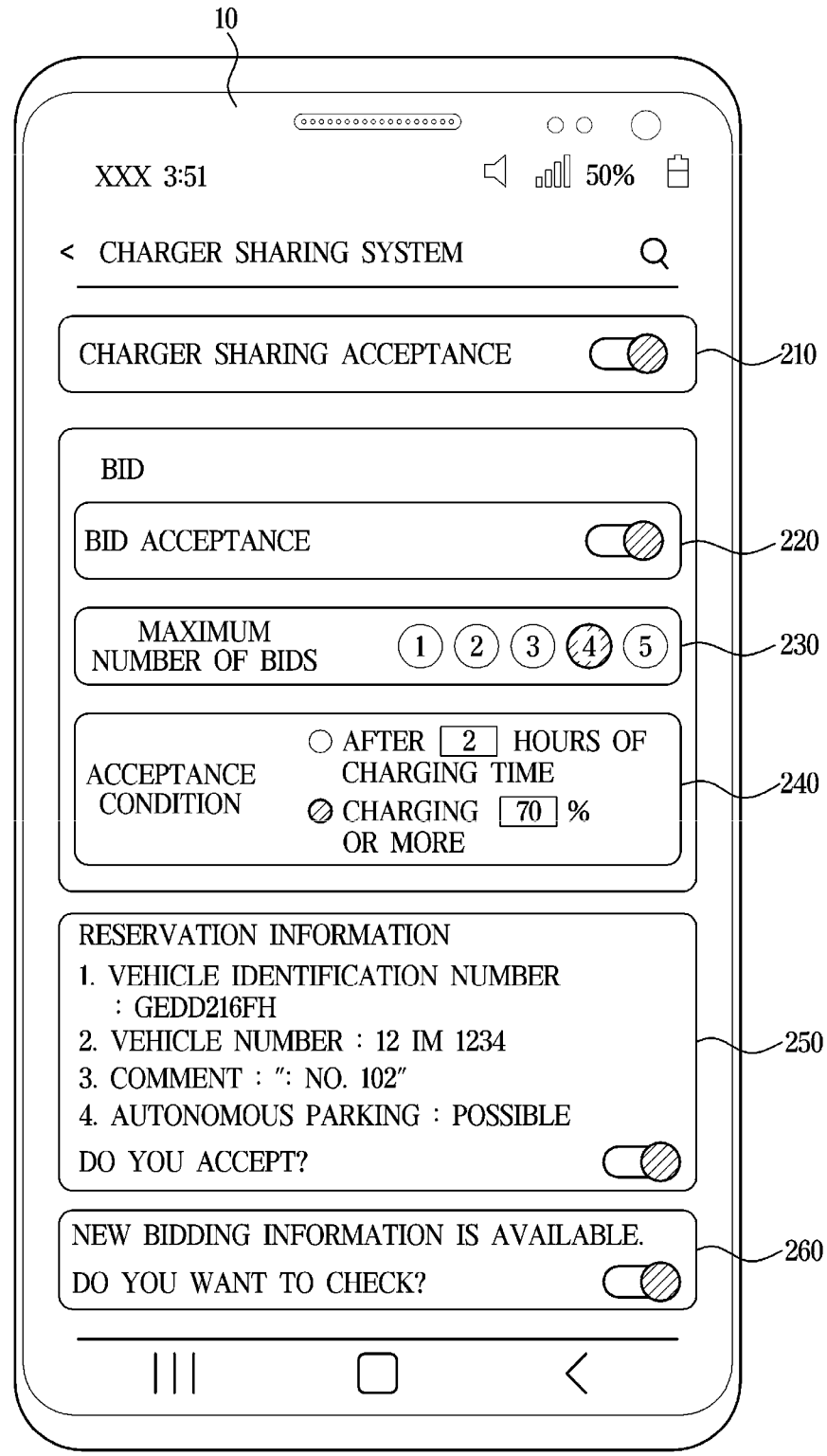
FIG. 3 illustrates a screen displayed on an occupant terminal in connection with reservation and bidding of a charger.

FIG. 3 illustrates a screen displayed on an occupant terminal in connection with reservation and bidding of a charger.

Referring to FIG. 3, the occupant terminal 10 may display a sharing setting field 210 for setting whether to share the charger 100. Also, the occupant terminal 10 may display the bid setting fields 220, 230, and 240. The bid setting fields 220, 230, and 240 may be activated when charger sharing is allowed.

The bid setting fields 220, 230, and 240 may include a bid acceptance selection box 220, a bid number selection box 230, and an acceptance condition setting box 240. For example, the maximum number of bids may be five. Bidding acceptance conditions may include charging time and/or charging amount. For example, the occupant may set the bidding to be possible after two hours of charging time of the occupant vehicle currently being charged using the occupant terminal 10. In addition, the occupant may set the bidding to be possible when the charging amount of the occupant vehicle currently being charged is 70% or more.

Also, the occupant terminal 10 may display the charger reservation information 250 on the screen. The charger reservation information 250 may include a reservation type, a vehicle identification number of the subscriber vehicle, a vehicle number of the subscriber vehicle, a subscriber comment, and a parking function of the subscriber vehicle. Also, the occupant terminal 10 may display the bid confirmation selection box 260. The bid confirmation selection box 260 may be activated when bidding is allowed. When the occupant selects the bid confirmation, the occupant terminal 10 may display the charger reservation information (first reservation information) and bid information (second reservation information) on the screen.

Figure 4:
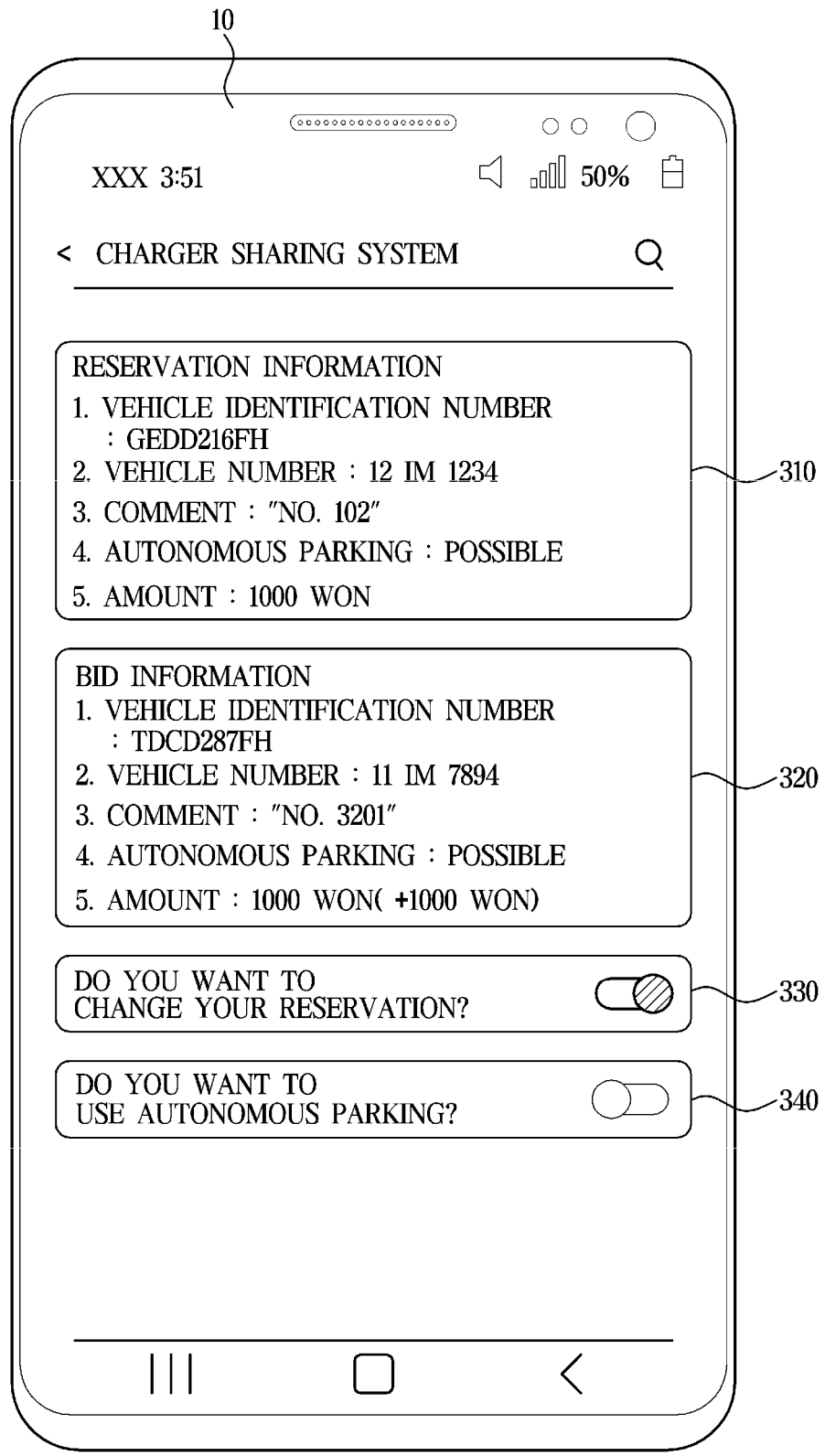
FIG. 4 illustrates a screen displayed on an occupant terminal in connection with changing a reservation of a charger.

FIG. 4 illustrates a screen displayed on an occupant terminal in connection with changing a reservation of a charger.

Referring to FIG. 4, the occupant terminal 10 may display charger reservation information 310 on the screen. The charger reservation information 310 may include a reservation type, a vehicle identification number of a subscriber vehicle, a vehicle number of a subscriber vehicle, a subscriber comment, and a parking function of a subscriber vehicle. In addition, the charger reservation information may include a reservation amount (for example, 1000 won).

Also, the occupant terminal 10 may display bid information (second reservation information) 320 on the screen. The occupant terminal 10 may display the vehicle identification number of the bidder vehicle, the vehicle number of the bidder vehicle, the bidder comment, the parking function of the bidder vehicle, and the bid amount (for example, 2000 won) on the screen.

Also, the occupant terminal 10 may display the reservation change box 330. The occupant may select one of the charger reservation information (first reservation information) or the bid information (second reservation information). For example, a higher amount may be selected from a reservation amount included in the charger reservation information than a bid amount included in the bid information. That is, when the occupant selects to change the reservation, the bid information (second reservation information) may be registered in the charger 100.

Also, the occupant terminal 10 may display an autonomous parking setting field 340. The occupant may turn on or off the autonomous parking function of the occupant vehicle through the autonomous parking setting field 340.

Figure 5:
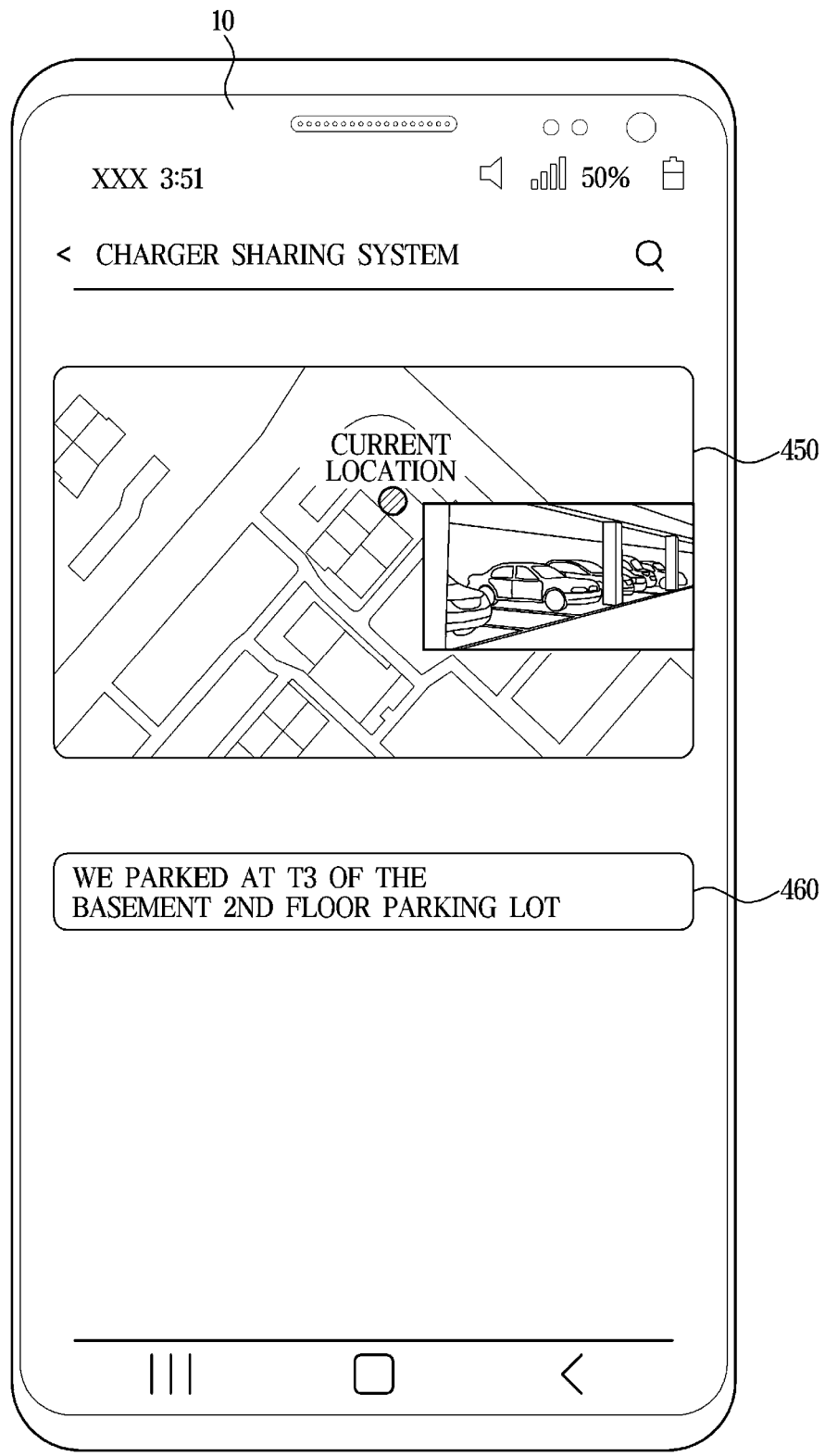
FIG. 5 illustrates a screen in which parking location information and parking completion message are displayed on an occupant terminal.

FIG. 5 illustrates a screen in which parking location information and parking completion message are displayed on an occupant terminal.

Referring to FIG. 5, the occupant terminal 10 may display parking location information 450 and parking completion message 460 of an occupant vehicle on a screen. The parking location information 450 may include a map and a photo. When autonomous parking of occupant vehicle is performed or when control authority of the occupant vehicle is transmitted to subscriber terminal 20, the occupant terminal 10 may receive the parking location information and the parking completion message of the occupant vehicle from the charger 100 and/or the subscriber terminal 20.

Figure 6:
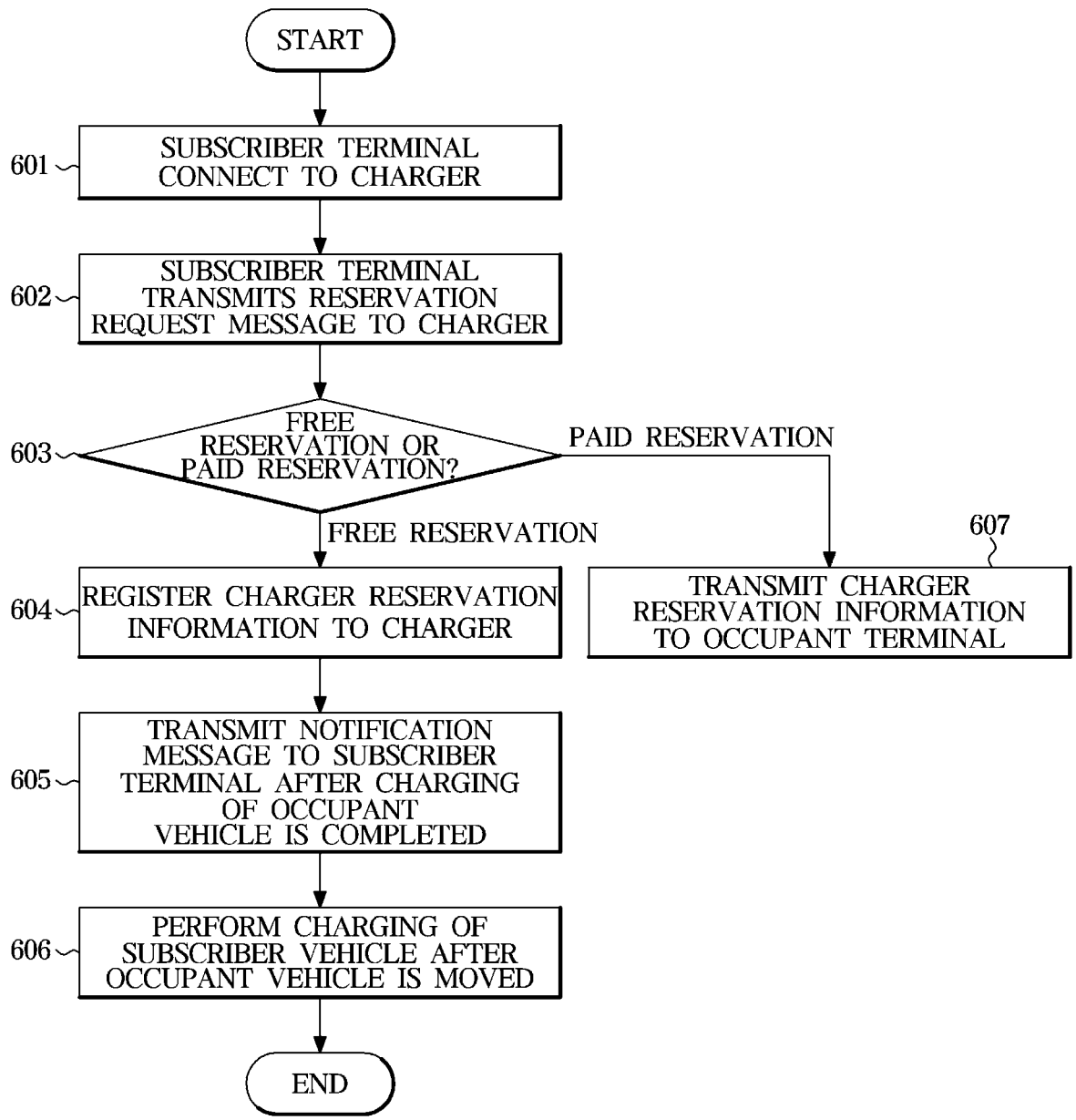
FIGS. 6, 7 and 8 illustrate flowcharts illustrating a charger sharing method according to an embodiment of the disclosure.
Figure 7:
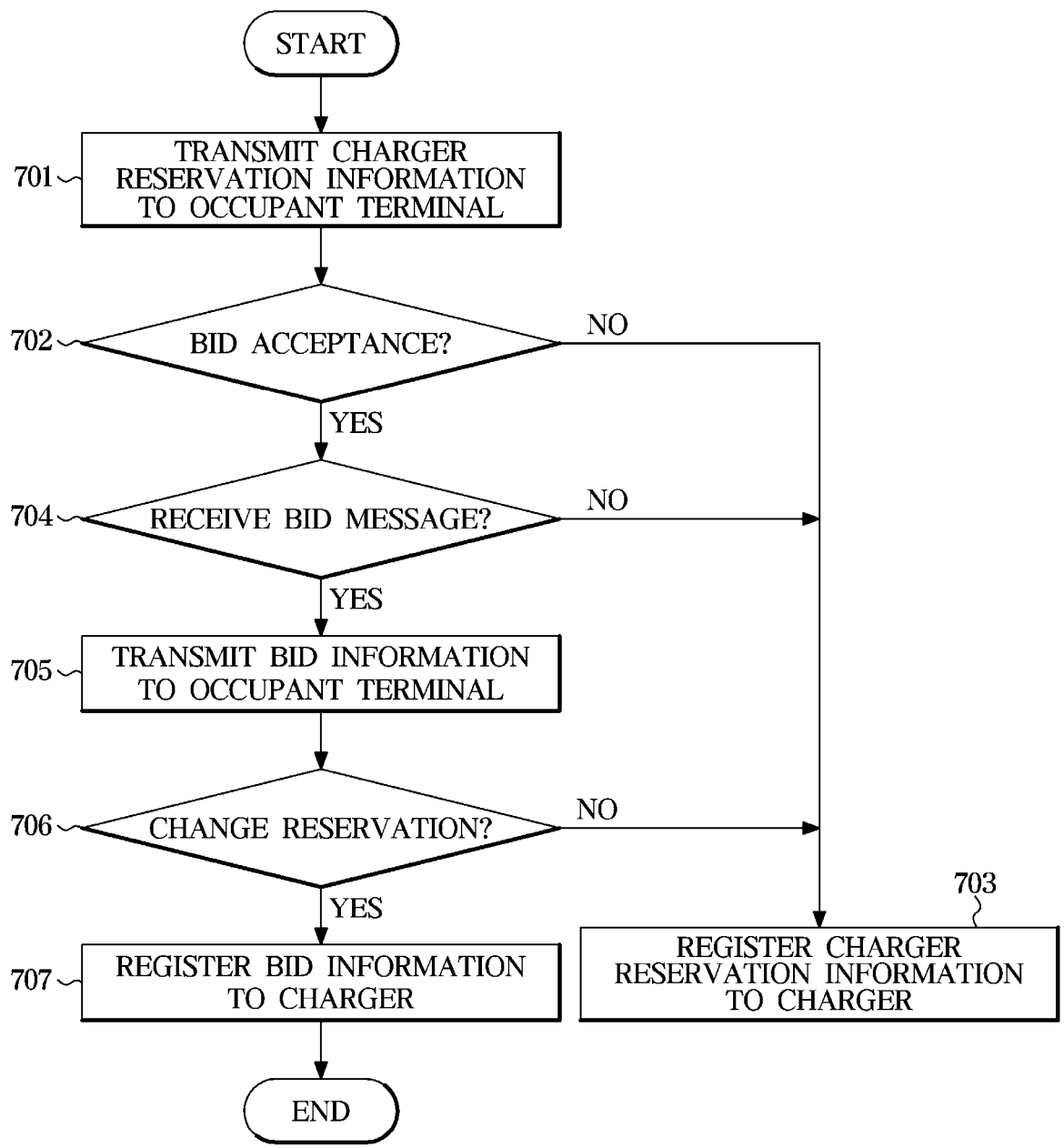
Figure 8:
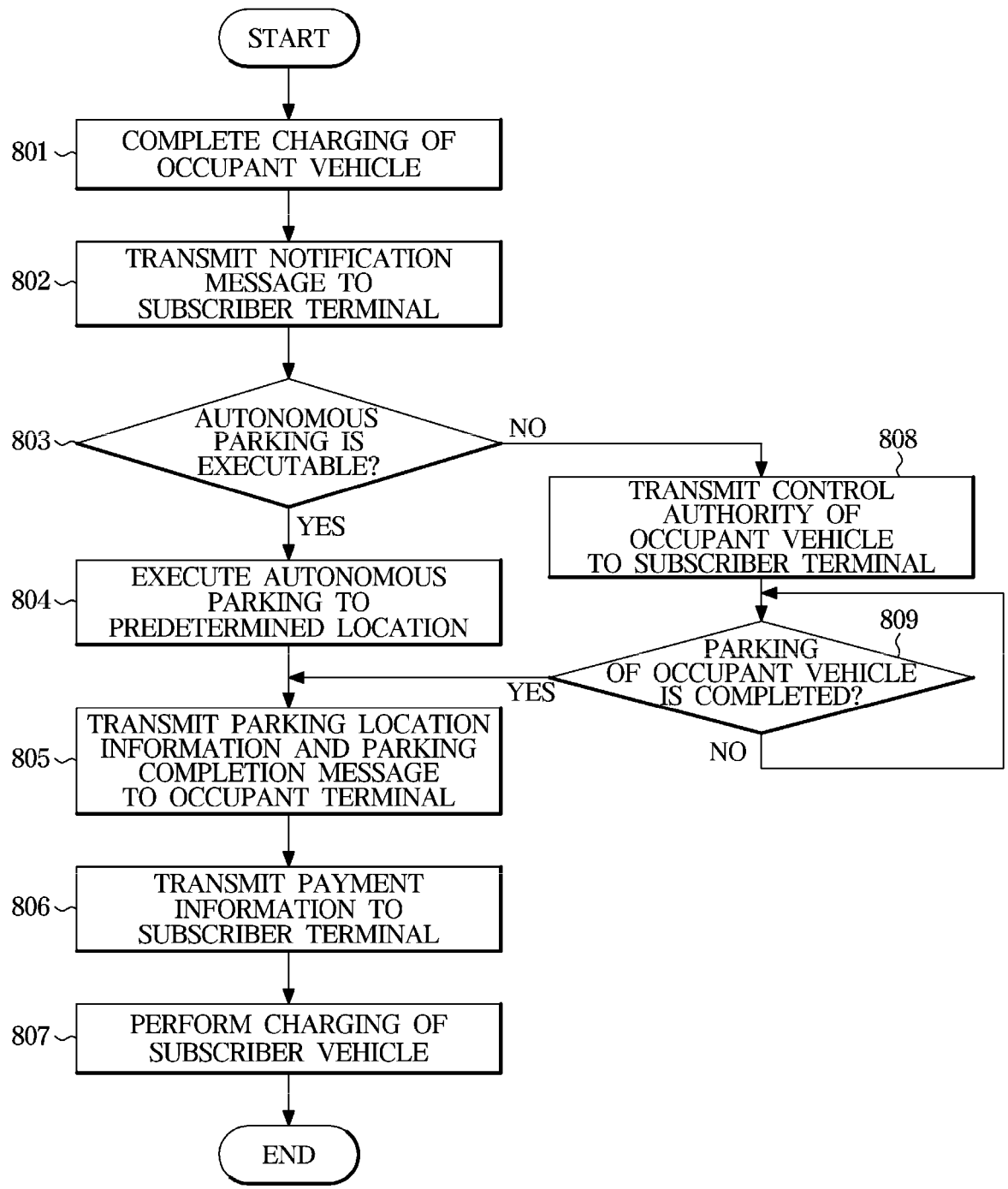

FIGS. 6, 7 and 8 illustrate flowcharts illustrating a charger sharing method according to an embodiment of the disclosure.

Referring to FIG. 6, a subscriber terminal 20 may first connect to a charger 100 (601). The charger 100 may receive subscriber information from the subscriber terminal 20. The charger 100 may receive a reservation request message including charger reservation information from the subscriber terminal 20 (602). When the charger sharing is permitted by the occupant terminal 10, the charger 100 may receive a reservation request message from the subscriber terminal 20.

The charger 100 may check whether the reservation type is free reservation or paid reservation from the charger reservation information (603). When the reservation type is free reservation, the charger 100 may register charger reservation information (604). When the charger reservation information is registered, the subscriber may use the charger 100 after the charging of the occupant vehicle is completed.

The charger 100 may transmit a notification message to the subscriber terminal 20 after the charging of the occupant vehicle is completed (605). When the subscriber vehicle is connected to the charging connector 150 after the occupant vehicle is moved, the charger 100 may perform charging of the subscriber vehicle (606).

When the reservation type is paid reservation, the charger 100 may transmit the charger reservation information to the occupant terminal 10 (607). The case where the reservation type is paid reservation is described in detail with reference to FIG. 7.

Referring to FIG. 7, when the reservation type is paid reservation, the charger 100 may transmit the charger reservation information to the occupant terminal 10 (701). The charger 100 may check bid setting information received from the occupant terminal 10. The bid setting information may include whether to allow a bid, a maximum number of bids when a bid is allowed, and a bid acceptance condition (702).

The charger 100 may receive a bid message from the bidder terminal 30 based on the bid setting information. When it is determined that the bidding is not allowed, the charger 100 may register the charger reservation information (first reservation information) received from the subscriber terminal 20 (702 and 703).

The charger 100 may receive a bid message from the bidder terminal 30 when the bid is permitted (702, 704). When the bid message is not received from the bidder terminal 30, the charger 100 may register the charger reservation information (first reservation information) (703). The charger 100 may transmit bid information (second reservation information) to the occupant terminal 10 based on the reception of the bid message from the bidder terminal 30 (705).

When the reservation change message is not received from the occupant terminal 10, the charger 100 may register the charger reservation information (first reservation information) (706, 703). The charger 100 may register the bid information (second reservation information) based on receiving the reception change message from the occupant terminal 10 (706 and 707).

Referring to FIG. 8, the charger 100 may confirm completion of charging of the occupant vehicle (801). The charger 100 may transmit a notification message to the subscriber terminal 20 after the charging of the occupant vehicle is completed (802). In addition, the charger 100 may obtain the parking setting information of the occupant vehicle from the occupant terminal 10 and check whether the autonomous parking function of the occupant vehicle is executable (803). The parking setting information includes whether autonomous parking of an occupant vehicle is allowed (autonomous parking on) or not allowed (autonomous parking off).

The charger 100 may execute autonomous parking of an occupant vehicle when autonomous parking is allowed (802, 804). The charger 100 may move the occupant vehicle to a predetermined location when executing autonomous parking of the occupant vehicle. The charger 100 may move the occupant vehicle to a predetermined location and then transmit the parking location information and the parking completion message to the occupant terminal 10 (805).

When the autonomous parking of the occupant vehicle is not allowed (autonomous parking off), the charger 100 may transmit the control authority of the occupant vehicle to the subscriber terminal 20 (808). The control authority of the occupant vehicle may be implemented with a digital key. The control authority of the occupant vehicle transmitted to the subscriber terminal 20 is available only for a predetermined time.

When the charger 100 transmits the control authority of the occupant vehicle to the subscriber terminal 20, the charger 100 may determine whether parking of the occupant vehicle is completed by receiving parking location information and parking completion message of the occupant vehicle from the subscriber terminal 20. (809). That is, the subscriber may transmit the parking location information and the parking completion message of the occupant vehicle to the charger 100 using the subscriber terminal 20. The charger 100 may transmit the parking location information and the parking completion message to the occupant terminal 10 (805).

The charger 100 may transmit payment information to the subscriber terminal 20 (806). The charger 100 may transmit payment information to the subscriber terminal 20 or the bidder terminal 30 when the reservation type is paid reservation. The payment information may include a reservation amount or a bid amount. In addition, the charger 100 may receive payment completion information from the subscriber terminal 20 or the bidder terminal 30.

When the subscriber vehicle is connected to the charging connector 150 after the occupant vehicle is moved, the charger 100 may perform charging of the subscriber vehicle (807).

Figure 9:
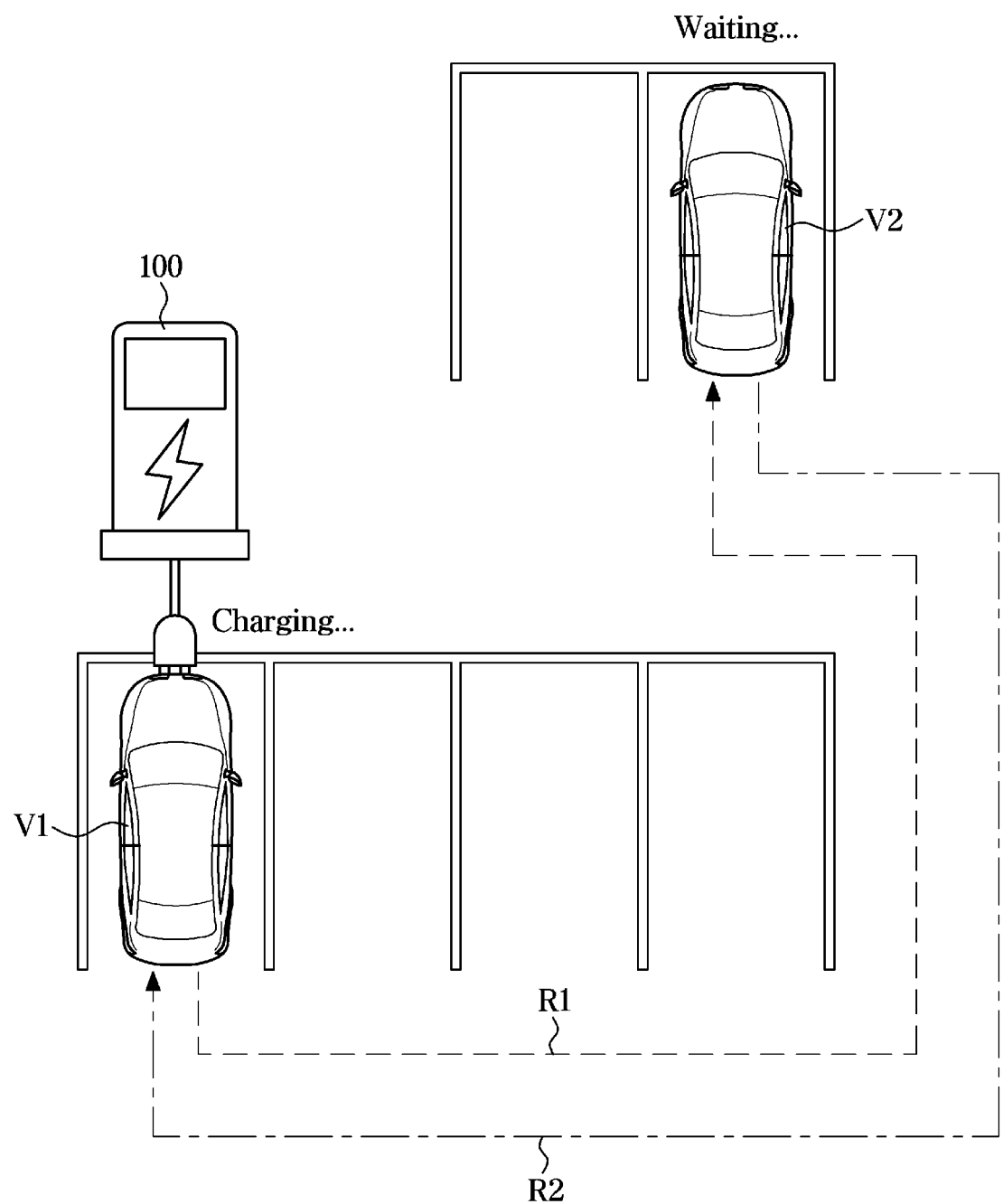
FIG. 9 illustrates an example of an autonomous parking method associated with a charger sharing method according to an embodiment the disclosure.

FIG. 9 illustrates an example of an autonomous parking method associated with a charger sharing method according to an embodiment the disclosure.

Referring to FIG. 9, the charger 100 may control the occupant vehicle V1 and the subscriber vehicle V2 through the autonomous parking system 40. The charger 100 may execute autonomous parking of the occupant vehicle V1 and autonomous parking of the subscriber vehicle V2 after the charging of the occupant vehicle V1 is completed. In this case, the occupant vehicle V1 and the subscriber vehicle V2 both have autonomous parking functions and are assumed to have autonomous parking on. In addition, it is assumed that charger reservation information is registered in the charger 100.

The autonomous parking system 40 may include parking space data and location data of the charger. In addition, the autonomous parking system 40 may obtain location information of the occupant vehicle V1 and location information of the subscriber vehicle V2 from the charger 100.

When charging of the occupant vehicle V1 completed, the charger 100 may generate an execution signal of autonomous parking for each occupant vehicle V1 and a subscriber vehicle V2, and transmit the execution signal of the autonomous parking to the autonomous parking system 40. The autonomous parking system 40 calculates the optimum travel paths R1 and R2 for each vehicle based on the location information of the occupant vehicle V1 and the location information of the subscriber vehicle V2, and may move the occupant vehicle V1 and the subscriber vehicle V2 along the calculated travel path. In FIG. 9, an occupant vehicle V1 and a subscriber vehicle V2 are illustrated as changing positions.

Meanwhile, when the occupant vehicle V1 and the subscriber vehicle V2 change positions with each other, the autonomous parking system 40 sequentially moves the occupant vehicle V1 and the subscriber vehicle V2 so that a third party cannot park. In addition, the charger 100 may restrict the third party from using the charger. When such an autonomous parking system 40 is utilized, it is not necessary to give the control authority of the vehicle to others, thereby reducing anxiety of users.

According to the disclosed charger sharing system and charger sharing method, users can effectively share a charger of a vehicle.

In addition, the disclosed charger sharing system and charger sharing method may enable charger sharing by providing revenue to users, and may relieve inconvenience caused in the charger sharing process.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A charger sharing system comprising:
    an occupant terminal, a subscriber terminal, and a charger connected through a network,
    wherein the charger is configured to receive a reservation request message comprising charger reservation information from the subscriber terminal and determine whether to register the charger reservation information based on a reservation type included in the charger reservation information,
    wherein the charger is configured to:
    transmit a notification message to the subscriber terminal after charging of an occupant vehicle is completed,
    obtain a parking setting information of the occupant vehicle from the occupant terminal when charging of the occupant vehicle is completed,
    transmit a control authority of the occupant vehicle to the subscriber terminal,
    receive a parking location information and a parking completion message of the occupant vehicle from the subscriber terminal, and
    transmit the parking location information and the parking completion message to the occupant terminal.

2. The charger sharing system according to claim 1, wherein the charger is configured to register the charger reservation information when the reservation type is a free reservation, or to transmit the charger reservation information to the occupant terminal when the reservation type is a paid reservation.

3. The charger sharing system according to claim 2, further comprising:
    a bidder terminal connected via the network,
    wherein the charger is configured to confirm a bid setting information from the occupant terminal when the reservation type is paid reservation, and receive a bid message from the bidder terminal based on the bid setting information or register the charger reservation information with the charger.

4. The charger sharing system according to claim 3, wherein the charger is configured to transmit a bid information included in the bid message to the occupant terminal in response to receiving the bid message from the bidder terminal and register the bid information in response to receiving a reservation change message from the occupant terminal.

5. The charger sharing system according to claim 4, wherein the charger is configured to register the charger reservation information when the bid message is not received from the bidder terminal or a reservation change message is not received from the occupant terminal.

6. The charger sharing system according to claim 1, wherein the charger is configured to transmit a payment information to the subscriber terminal after charging of the occupant vehicle is completed when the reservation type is paid reservation.

7. A charger sharing method comprising:
receiving a reservation request message comprising charger reservation information from a subscriber terminal by a charger;
determining whether to register the charger reservation information based on a reservation type included in the charger reservation information;
transmitting a notification message to the subscriber terminal after charging of an occupant vehicle is completed;
obtaining a parking setting information of the occupant vehicle from the occupant terminal when charging of the occupant vehicle is completed;
transmitting a control authority of the occupant vehicle to the subscriber terminal;
receiving the parking location information and the parking completion message of the occupant vehicle from the subscriber terminal; and
transmitting the parking location information and the parking completion message to the occupant terminal.

8. The charger sharing method according to claim 7, wherein the determining whether to register the charger reservation information comprises:
registering the charger reservation information when the reservation type is a free reservation; or
transmitting the charger reservation information to an occupant terminal when the reservation type is a paid reservation.

9. The charger sharing method according to claim 8, wherein the determining whether to register the charger reservation information further comprises:
confirming a bid setting information from the occupant terminal when the reservation type is paid reservation; and
receiving a bid message from a bidder terminal based on the bid setting information or register the charger reservation information with the charger.

10. The charger sharing method according to claim 9, wherein the determining whether to register the charger reservation information further comprises:
transmitting a bid information included in the bid message to the occupant terminal in response to receiving the bid message from the bidder terminal; and
registering the bid information in response to receiving a reservation change message from the occupant terminal.

11. The charger sharing method according to claim 10, wherein the determining whether to register the charger reservation information further comprises:
registering the charger reservation information when the bid message is not received from the bidder terminal or the reservation change message is not received from the occupant terminal.

12. The charger sharing method according to claim 7, further comprising: transmitting a payment information to the subscriber terminal after charging of the occupant vehicle is completed when the reservation type is paid reservation.

* * * * *